US007998051B2

(12) United States Patent
Klintenstedt

(10) Patent No.: US 7,998,051 B2
(45) Date of Patent: Aug. 16, 2011

(54) CENTRIFUGAL SEPARATOR WITH SEALING DEVICE

(75) Inventor: Kjell Klintenstedt, Saltsjö-Boo (SE)

(73) Assignee: Alfa Laval Corporate AB, Lund (SE)

( * ) Notice: Subject to any disclaimer, the term of this patent is extended or adjusted under 35 U.S.C. 154(b) by 307 days.

(21) Appl. No.: 12/305,268

(22) PCT Filed: Jun. 12, 2007

(86) PCT No.: PCT/SE2007/050411

§ 371 (c)(1),
(2), (4) Date: Feb. 10, 2009

(87) PCT Pub. No.: WO2008/013495

PCT Pub. Date: Jan. 31, 2008

(65) Prior Publication Data

US 2009/0280974 A1 Nov. 12, 2009

(30) Foreign Application Priority Data

Jun. 20, 2006 (SE) ...................................... 0601355

(51) Int. Cl.
*F16J 15/16* (2006.01)
*F16J 15/40* (2006.01)
*B04B 1/08* (2006.01)

(52) U.S. Cl. ............................ 494/41; 494/70; 277/387

(58) Field of Classification Search .................... 494/38, 494/41, 43, 67–74; 277/377, 379, 380, 385, 277/387

See application file for complete search history.

(56) References Cited

U.S. PATENT DOCUMENTS

| | | | | |
|---|---|---|---|---|
| 2,637,491 | A * | 5/1953 | Fitzsimmons | 494/41 |
| 2,957,711 | A | 10/1960 | Aspelin | |
| 3,126,338 | A * | 3/1964 | Steinacker | 494/41 |
| 3,475,033 | A | 10/1969 | Voitik | |
| 3,685,839 | A | 8/1972 | Frei | |
| 3,767,212 | A * | 10/1973 | Ludwig | 277/400 |
| 4,017,023 | A * | 4/1977 | Hemfort | 494/41 |
| 4,810,240 | A * | 3/1989 | Zuccato | 494/14 |
| 4,846,728 | A * | 7/1989 | Roman | 494/41 |
| 4,936,821 | A * | 6/1990 | Zuccato | 494/14 |
| 2009/0280974 | A1* | 11/2009 | Klintentedt | 494/41 |

FOREIGN PATENT DOCUMENTS

| | | |
|---|---|---|
| DE | 3533402 A1 * | 3/1987 |
| SU | 555908 * | 5/1977 |

* cited by examiner

*Primary Examiner* — Charles E Cooley
(74) *Attorney, Agent, or Firm* — Michaud-Kinney Group LLP

(57) ABSTRACT

In a centrifugal separator comprising a first and second separator part having a centrifuge rotor and rotates during operation relative to the first separator part. A space connecting the first and second separator parts houses a rotating liquid body during operation. A mechanical sealing device is provided at the space and includes a first sealing element on the first separator part having a first contact surface, and a second sealing element on the second separator part having a second contact surface. The liquid body on the first sealing element or the second sealing element and displaces the same axially so that the first and second contact surfaces are pressed against each other. A pre-tensioning element exerts force on the sealing element which acts to displace the first contact away from the second contact surfaces so that a gap is formed, forming a throttling.

14 Claims, 8 Drawing Sheets

CENTRIFUGAL SEPARATOR WITH SEALING DEVICE

FIELD OF THE INVENTION

The present invention refers to a centrifugal separator and more particularly to sealing devices used therewith.

BACKGROUND OF THE INVENTION

In centrifugal separators there is a need for efficient mechanical sealings in several different positions, i.e. mechanical sealings which are suitable for sealing a gap between a rotating separator part and a stationary separator part, or between two rotating separator parts rotating at different speeds, for instance in decanter centrifuges.

In for instance so-called hermetic centrifugal separators, mechanical sealing is required between the rotating centrifuge rotor and a stationary inlet and/or outlet pipe extending into the centrifuge rotor. Furthermore, one or several mechanical seals are required between a stationary connection housing and a rotating inlet and/or outlet pipe connected to and communicating with the interior of the centrifuge rotor.

One problem with available mechanical seals is to provide a sufficient abutment force between the two contact surfaces so that an efficient sealing of the gap is achieved during all operating conditions. A further problem with available mechanical seals is the wear which they are subjected to. In particular, when the centrifugal separator is started and before any liquid is available at the mechanical seal, the contact surfaces of the seal will slide against each other in a dry state, which results in high wear. In order to solve this problem, expensive equipment is required for supplying sealing liquid to the mechanical sealing. In many applications, such as at separation of food products, there are at the same time high hygienic requirements. It is therefore necessary to be able to simultaneously clean all surfaces which are in contact with the product through a so-called Cleaning In Place, CIP.

U.S. Pat. No. 4,846,728 discloses a centrifugal separator comprising a first stationary separator part in the form of a stationary casing and a second separator part, which comprises a centrifuge rotor. The centrifuge rotor is non-rotating during a rest state and rotates during operation about an axis of rotation at a determined speed in relation to the stationary casing. A space is provided in connection to the casing and the centrifuge rotor and houses, during operation, a rotating liquid body which contains a medium. A mechanical sealing device is provided at the space for sealing of the space. The mechanical sealing device comprises a first sealing element, which is provided on the casing and has a first contact surface, and a second sealing element, which is provided on the centrifuge rotor and has a second contact surface which is parallel to the first contact surface. The first contact surface and the second contact surface are arranged to abut each other during operation. The mechanical sealing device is designed in such a way that the rotating body during operation state on the second sealing element in such a way that the second contact surface is pressed against the first contact surface with an abutment force.

SUMMARY OF THE INVENTION

The object of the invention is to remedy the problems mentioned above and to provide a centrifugal separator with an improved mechanical seal. More specifically, the object is a centrifugal separator having a mechanical seal with improved life and proper sealing ability.

This object is achieved by the centrifugal separator initially defined, which is characterized in that the mechanical sealing device comprises a pre-tensioning element which is arranged to exert a pre-tensioning force on the axially displaceable sealing element, which pre-tensioning force acts to displace the first contact surface and the second contact surface from each other, that the pre-tensioning force is so large that a gap is formed between the first contact surface and the second contact surface in the rest state and that the gap is dimensioned in such a way that it forms a throttling.

By means of such a pre-tensioning element it is possible to provide the two contact surfaces in such a way that they will not be in contact with each other during the rest state, i.e. when the two separator parts do not rotate in relation to each other and during an initial state when the speed difference between the two separator parts is relatively small and when no liquid from the rotating liquid body still does not reach the contact surfaces. Consequently, the wear of the sealing element during this initial state may be reduced. The invention also permits an efficient cleaning of the mechanical sealing device in that the centrifugal separator during cleaning may be operated at such a low number of revolutions that the contact surfaces do not abut each other. The cleaning liquid may then pass between the contact surfaces, and cleaning of the rear side of the sealing device may be achieved. Furthermore, the gap ensures that the contact surfaces are not in contact with each other in the rest state and in the initial state when the relative rotation between the separator parts is zero or very slow. When the second separator part, comprising the centrifuge rotor, is accelerated from the rest state and the initial state, the throttling will provide a pressure drop in the liquid from the rotating body which reaches and flows through the gap. Thanks to this pressure drop, the effect of the abutment force generated by the liquid body is increased.

According to an embodiment of the invention, the pre-tensioning element extends around the axis of rotation. The pre-tensioning element may thus consist of a ring spring of any design that provides the desired pre-tensioning force. The pre-tensioning element may also be formed by an annular piston or the like which acts on the displaceable sealing element and in turn is hydraulically, pneumatically or electrically driven. However, it is to be noted that the pre-tensioning element also may be formed by a plurality of separate pre-tensioning members, such as screw springs, hydraulic or pneumatic pistons etc.

According to a further embodiment of the invention, the pre-tensioning element extends in a recess, which is provided in the axially displaceable sealing element and extends around the axis of rotation. Furthermore, the pre-tensioning element may extend in a recess, which is provided in one of the first and second separator parts on which the displaceable sealing element is provided.

According to a further embodiment of the invention, a ring seal extends around the axis of rotation, wherein the ring seal is provided between the axially displaceable sealing element and the one of the first and second separator parts on which the displaceable sealing element is provided. Advantageously, the ring seal may form the pre-tensioning element. The pre-tensioning element may then be manufactured from an elastomeric material. Such a material with elastic properties may provide the pre-tensioning force and at the same time seal an axial ring gap between the axially displaceable sealing element and the one of the first and second separator parts on which the displaceable sealing element is provided.

According to a further embodiment of the invention, the axially displaceable sealing element has a first pressure surface, which is turned towards the space and from its contact surface and which has a first surface area projected on a radial plane, and possibly a second pressure surface, which is turned towards the space and towards its contact surface and which has a second surface area projected on the radial plane. The liquid body may thus act on the first pressure surface for obtaining the desired abutment force. It is to be noted that the second pressure force may have a surface area which is zero. Advantageously, the first surface area is however larger than the second surface area. Moreover, it is to be noted that the radial position of the pressure surfaces influences the action of the liquid body, i.e. the size of the abutment force.

According to a further embodiment of the invention, the first separator part comprises at least one channel for feeding and/or discharging the medium into and/or out from the centrifuge rotor. Such a channel may be formed by the inlet and/or outlet member which may be stationary or rotating.

According to a further embodiment of the invention, the first separator part is a stationary separator part. For instance, the first separator part may comprise a stationary casing enclosing the centrifuge rotor. The first separator part may also comprise a stationary connection member, which encloses a rotating inlet and/or outlet member of the second separator part, wherein the inlet and/or outlet member forms at least one channel for feeding and/or discharging the medium into and/or out from the centrifuge rotor.

BRIEF DESCRIPTION OF THE DRAWINGS

The present invention is now to be explained more closely by means of a description of various embodiments and with reference to the drawings attached hereto.

DETAILED DESCRIPTION OF VARIOUS EMBODIMENTS OF THE INVENTION

Figure 1:
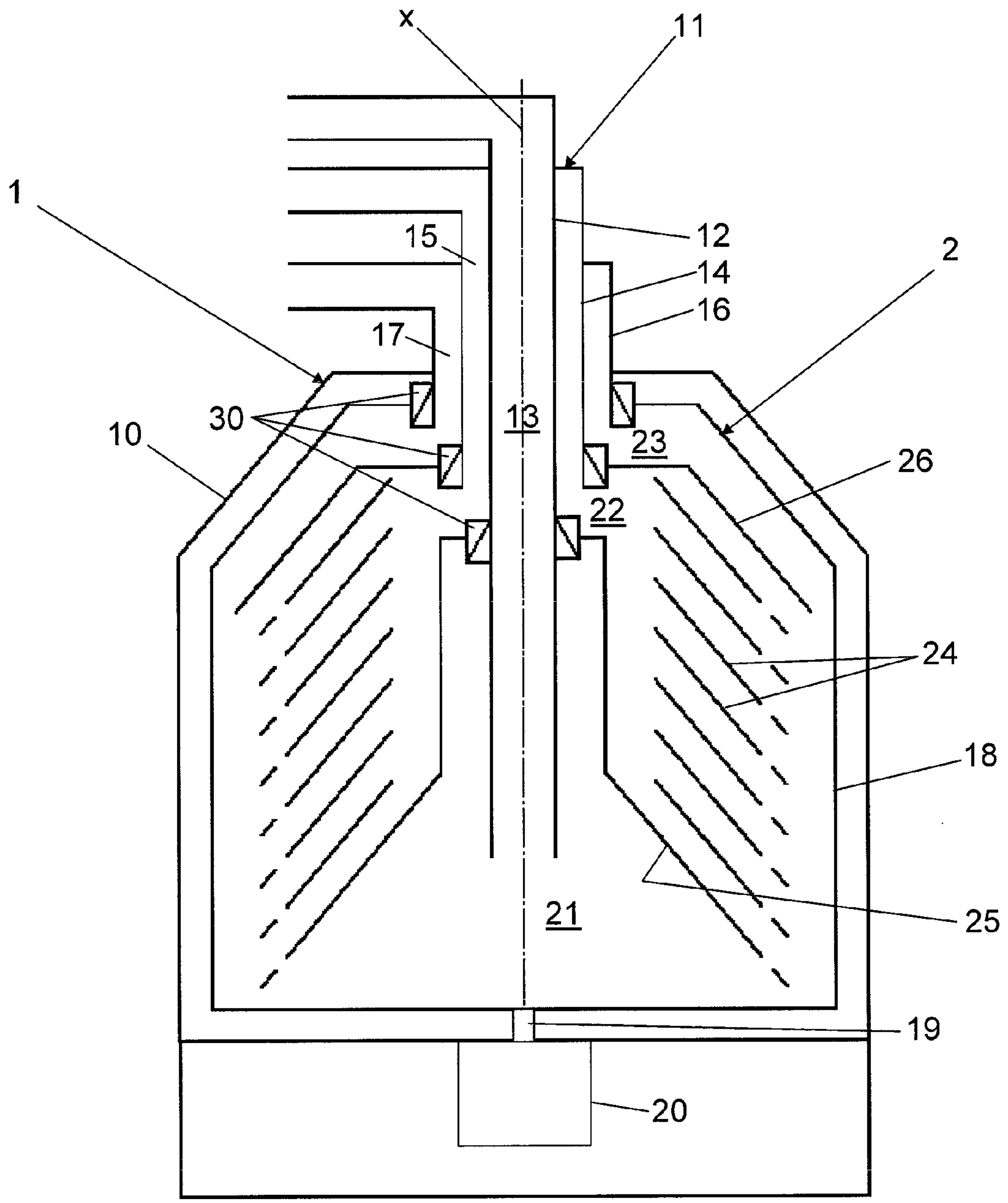
FIG. 1 discloses schematically a centrifugal separator according to a first embodiment of the invention.

FIG. 1 discloses schematically a centrifugal separator for separation of at least two phases of a medium. The centrifugal separator comprises a first separator part 1 and a second separator part 2.

In the first embodiment, the first separator part 1 comprises a stationary casing 10 and a stationary inlet and/or outlet member 11 which comprises a first pipe 12, which encloses a first channel 13 for feeding of the medium to be separated, a second pipe 14, which encloses a second channel 15 for discharging a relatively light phase of the medium, and a third pipe 16, which encloses a third channel 17 for discharging a relatively heavy phase of the medium.

The second separator part 2 comprises a centrifuge rotor 18 and a spindle 19, which are driven to rotate about an axis x of rotation by means of a suitable drive member 20, for instance an electric motor. The second separator part 2, i.e. the centrifuge rotor 18, is arranged to be driven at a determined high speed of rotation by the drive member 20 during an operation state. The speed of rotation may of course vary depending of the medium to be separated and during various periods of the separation process. During a rest state, the second separator part 2 is non-rotating. During an initial state, the centrifugal separator is started, wherein the second separator part 2 is accelerated.

The inlet and/or outlet member 11 extends in the first embodiment along the axis x of rotation into the centrifuge rotor 18 from above when the centrifugal separator is viewed in a normal position of use.

The centrifuge rotor 18 encloses an inlet chamber 21, an outlet chamber 22 for the light phase and an outlet chamber 23 for the heavy phase. The centrifuge rotor 18 also comprises in a manner known per se a set of rotating separation discs 20 which are provided between a first limiting disc 25 and a second limiting disc 26. In the embodiments disclosed, the discs 24-26 are conical.

Figure 5:
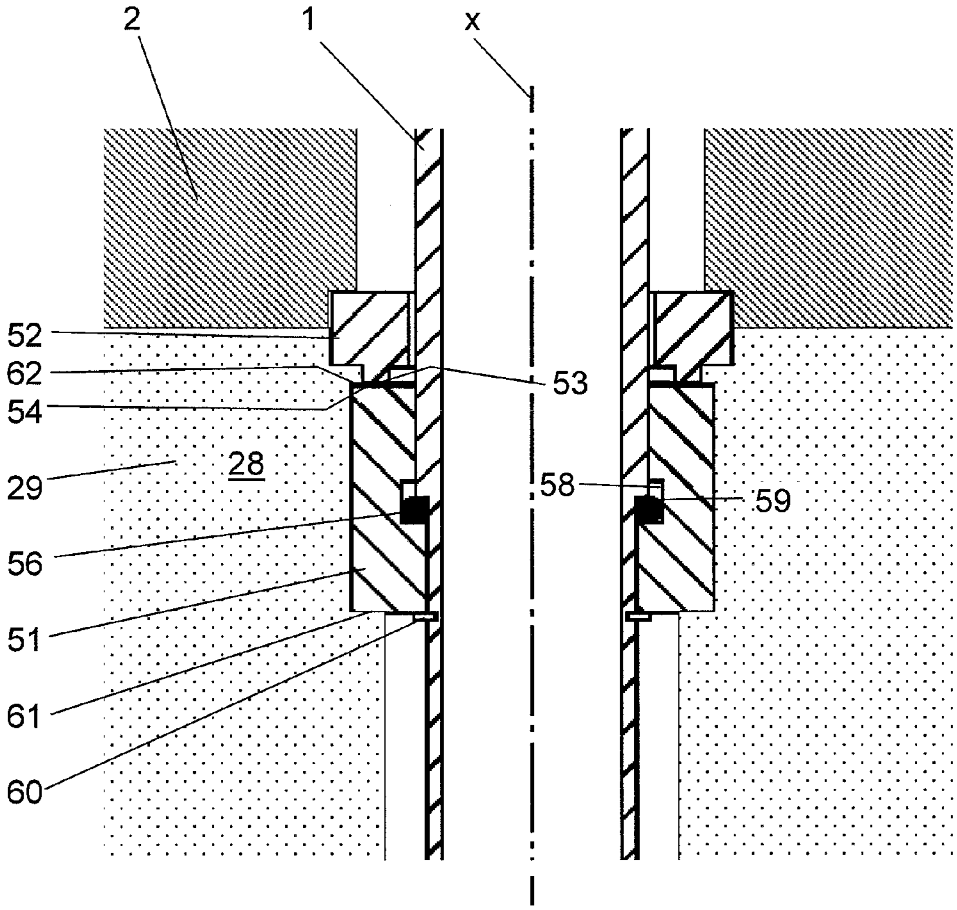
FIG. 5 discloses schematically a first variant of a mechanical sealing device of the centrifugal separator.

The three chambers 21, 22, 23 form a respective space 28, see FIG. 5, in connection to the first separator part 1, i.e. in the first embodiment the stationary pipes 12, 14 and 16, and to the second separator part 4, i.e. in the first embodiment the centrifuge rotor 18 and the rotating discs 24, 25 and 26.

During operation of the centrifugal separator, i.e. during an operation state, a rotating liquid body 29 will be formed in each of these spaces 28 formed by the three chambers 21, 22 and 23.

The centrifugal separator comprises three mechanical sealing devices 30, which are disclosed schematically in FIG. 1 and which are provided at each of these spaces 28 formed by the three chambers 21, 22 and 23. These mechanical sealing devices 30 have the function to seal the respective space 28 so that liquid of the rotating liquid body 29 cannot be conveyed out from the respective space 28 in a non-desired manner. The mechanical sealing device is to be explained more closely below in connection with the description of FIGS. 5-8.

Figure 2:
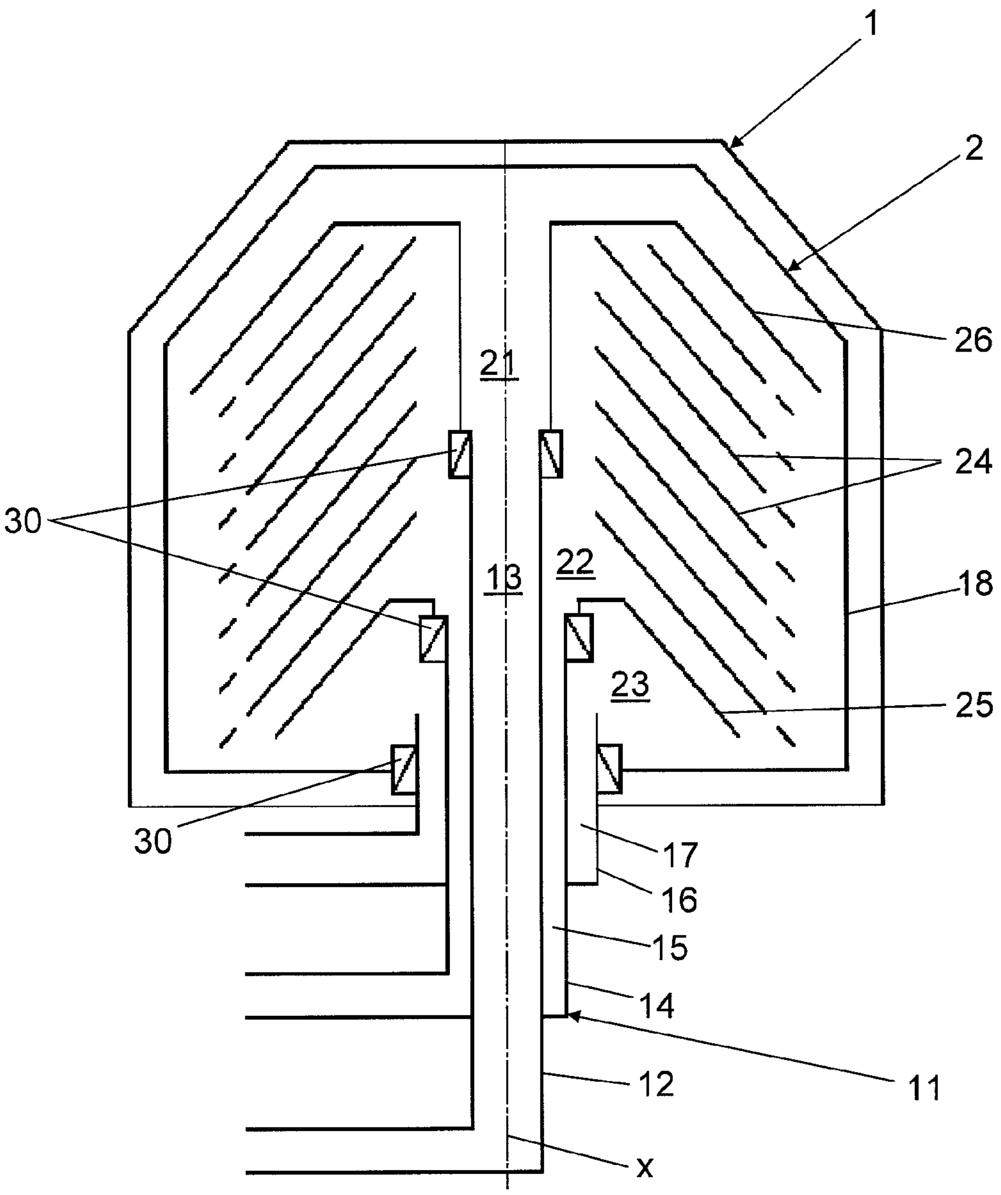
FIG. 2 discloses schematically a centrifugal separator according to a second embodiment of the invention.

FIG. 2 discloses a second embodiment which differs from the first embodiment in that the inlet and/or outlet member 11 extends along the axis x of rotation into the centrifuge rotor 18 from below when the centrifugal separator is viewed in a normal position of use. The drive member 20 is not disclosed in FIG. 2. It is to be noted here that the same reference signs have been used for elements and parts which have the same or substantially the same function in the various embodiments and variants which are described.

Figure 3:
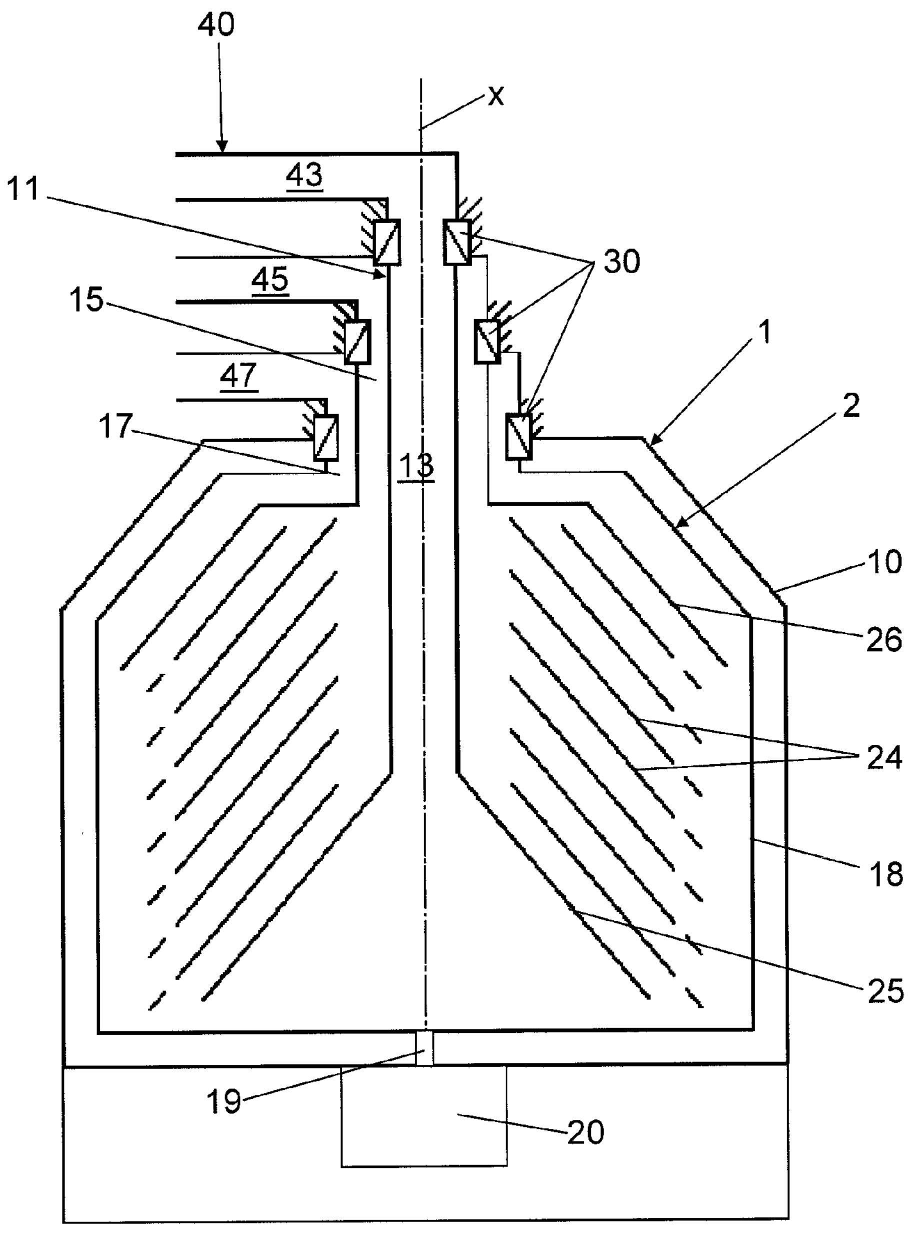
FIG. 3 discloses schematically a centrifugal separator according to a third embodiment of the invention.

FIG. 3 discloses a third embodiment which differs from the first embodiment in that the inlet and/or outlet member 11 is fixedly connected to the rotating centrifuge rotor 18. A stationary connection member 40 encloses the rotating inlet and/or outlet member 11. The connection member 40 forms three separate channels 43, 45 and 47 which communicate with a respective channel 13, 15 and 17 of the inlet and/or outlet member 11. In the same way as in the two first embodiments, corresponding spaces 28 will, see FIG. 5, be formed in connection to the channels 13 and 43, to the channels 15 and 45, and to the channels 17 and 47. During operation of the centrifugal separator, i.e. in the operation state, a rotating liquid body 29, see FIG. 5, will be formed in each of these spaces 28. Also the third embodiment comprises three mechanical sealing devices 30 which are disclosed schematically in FIG. 3 and which are provided at each of these spaces 28. Also in this case, the mechanical sealing devices 30 have the function to seal the respective space 28 so that liquid of the rotating body 29 cannot be conveyed out from the respective space 28 in a non-desired manner.

Figure 4:
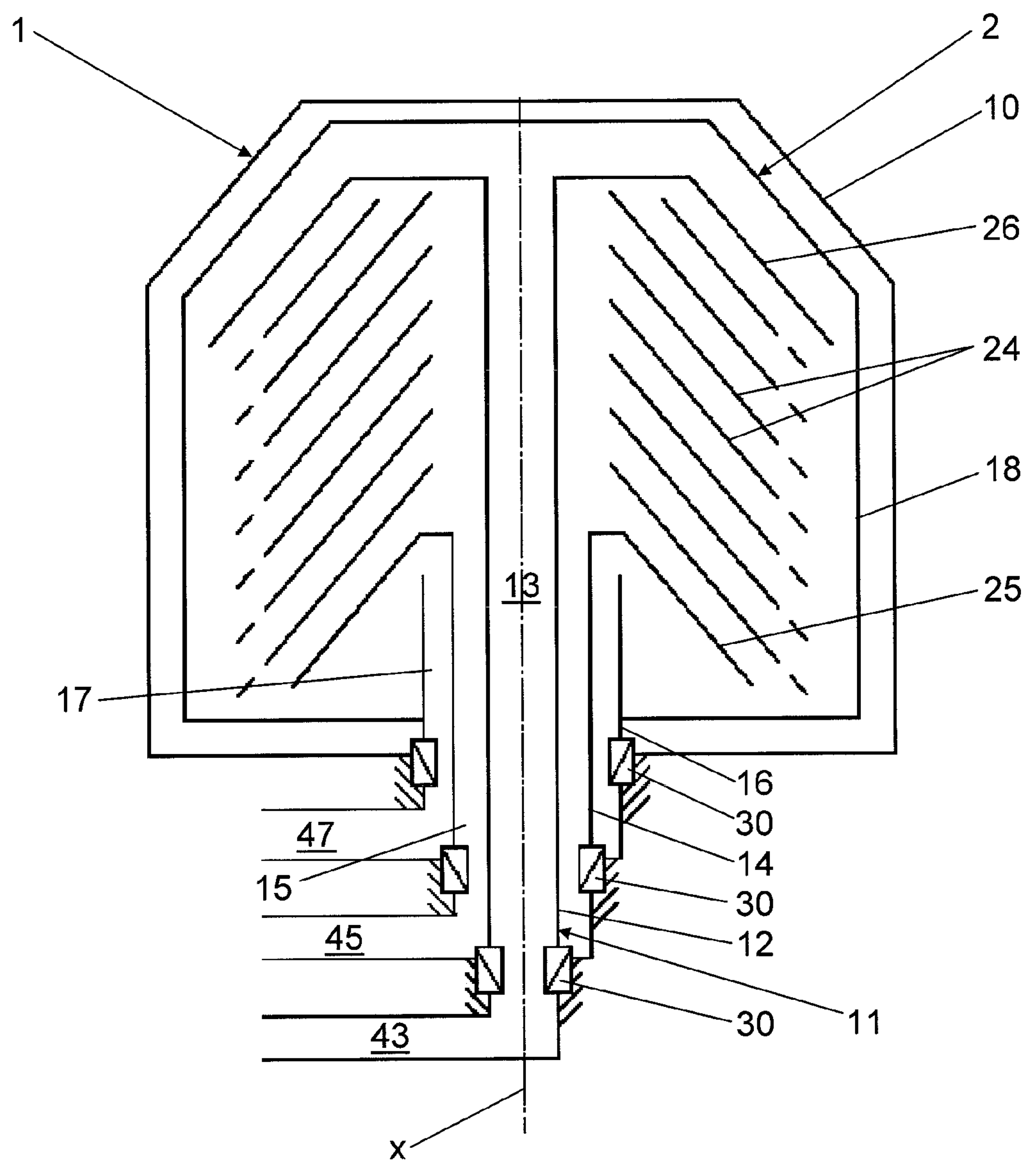
FIG. 4 discloses schematically a centrifugal separator according to a fourth embodiment of the invention.

FIG. 4 discloses a fourth embodiment which differs from the third embodiment in that the inlet and/or outlet member 11 extends along the axis x of rotation into the centrifuge rotor 18 from below when the centrifugal separator is viewed in a normal position of use and that the connection member 40 thus is provided at the underside of the casing 10. The drive member 20 is not a disclosed in FIG. 4. It is to be noted here that the rotating inlet and/or outlet member 11 may be formed by a spindle carrying the centrifuge rotor and being connected to the drive motor.

A first variant of the mechanical sealing device 30 is disclosed in FIG. 5. The mechanical sealing device 30 comprises a first sealing element 51 and a second sealing element 52. The first sealing element 51 is annular and provided on the first separator part 1, compare FIGS. 1 and 2, in such a way that it extends around the axis x of rotation. Also the second sealing element 52 is annular and provided on the second separator part 2 in such a way that it extends around the axis x of rotation. The first sealing element 51 has a first annular contact surface 53 and the second sealing element 52 has a second annular contact surface 54 which is parallel to the first contact surface. In FIG. 5, the contact surfaces are parallel to a radial plane. However, it is to be noted that the two parallel contact surfaces 53 and 54 possibly may have a somewhat conical shape.

The mechanical sealing device 30 is designed in such a way that the rotating liquid body 29 during the operation state acts on one of the first sealing element 51 and the second sealing element 52, and displaces the latter axially in such a way that the first contact surface 53 and the second contact surface 54 are pressed against each other with an abutment force. In FIG. 5, the mechanical sealing device 30 is designed in such a way that the liquid body 29 acts on the first sealing element 51.

Figure 8:
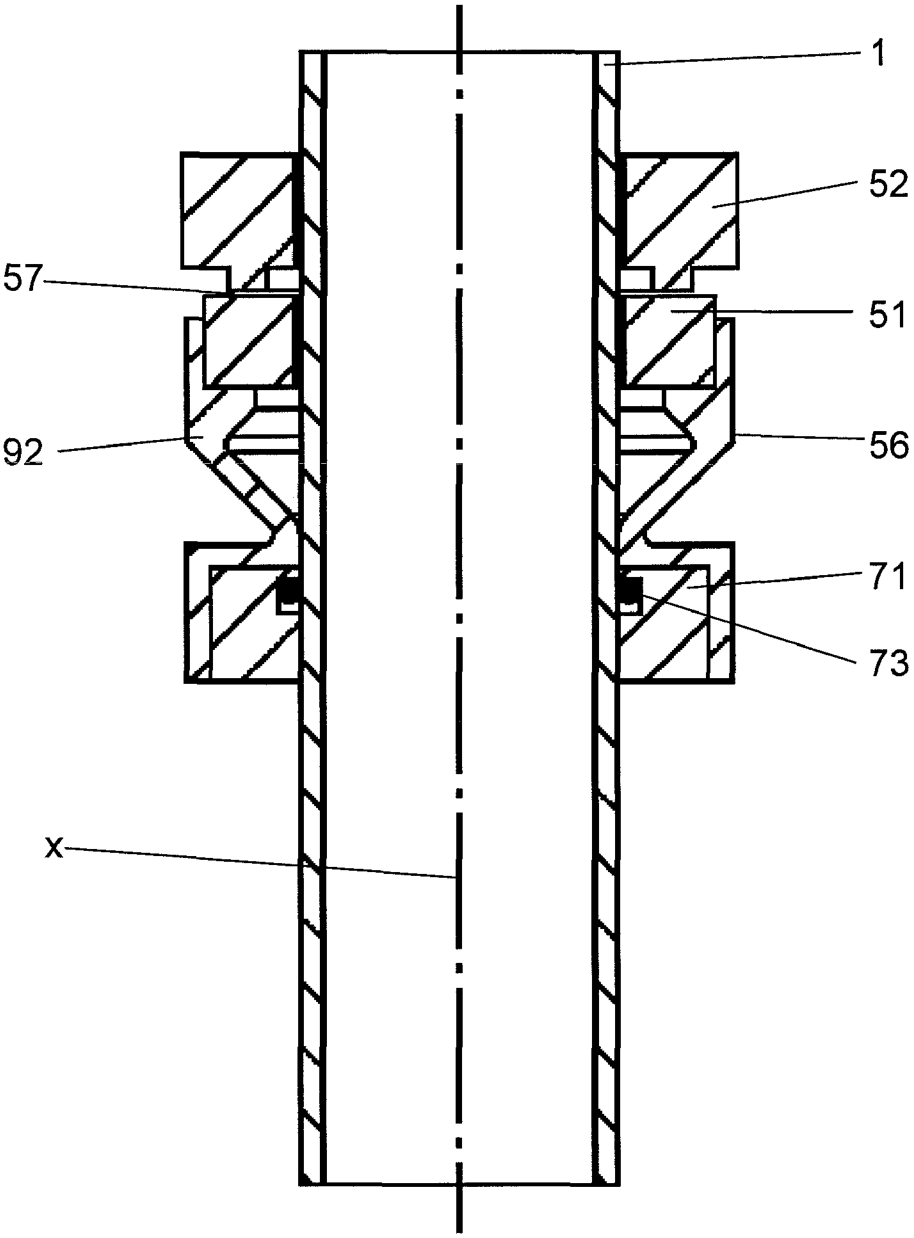
FIG. 8 discloses schematically a fourth variant of a mechanical sealing device of the centrifugal separator.

The mechanical sealing device 30 comprises a pre-tensioning element 56 which is arranged to exert a pre-tensioning force on the axially displaceable sealing element, i.e. in FIG. 5 on the first sealing element 51. The pre-tensioning force exerted by the pre-tensioning element 56 acts to displace the first contact surface 53 and the second contact surface 54 from each other. The pre-tensioning force is so large that a gap 57, which is illustrated in FIG. 8, is formed between the first contact surface 53 and the second contact surface 54 in the rest state, i.e. when the centrifuge rotor 18 is non-rotating, and in the initial state. In these states, there is thus no rotating liquid body 29 which acts on the axially displaceable sealing element 51 and which may provide a lubrication of the contact surfaces 53, 54. Furthermore, the gap 57 is dimensioned in such a way that it forms a throttling. When the centrifuge rotor 18 is accelerated from the rest state and the initial state, the throttling will provide a pressure drop of the liquid from the rotating liquid body 29 which reaches and flows through the gap 57. Thanks to this pressure drop, the space 28 is filled and consequently the action of the abutment force generated by the liquid body 29 is increased.

In FIG. 5, the pre-tensioning element 56 is annular and extends around the axis x of rotation. The pre-tensioning element 56 extends in a recess 58, which is provided in the first sealing element 51 and which is axially displaceable sealing element. Also the recess 58 extends around the axis x of rotation. The pre-tensioning element 58 also extends in a recess 59, which is provided in the one of the second separator part 2 on which the displaceable first sealing element 51 is provided. The recess 59 has in FIG. 5 the shape of a shoulder. The recess 58 has a longer axial length than the pre-tensioning element 36 provided in the recess 58.

The mechanical sealing device 30 also comprises a ring sealing extending around the axis x of rotation and provided between the axially displaceable first sealing element 31 and the second separator part 2. In FIG. 5, the ring sealing is formed by the pre-tensioning element 56 which is manufactured in an elastomer material, for instance any suitable elastic polymer material or natural or synthetic rubber. In FIG. 5, also a stop ring 60 limiting the axial displacement of the first sealing element 51, i.e. determining the maximum size of the gap 57, is disclosed.

The axially displaceable first sealing element 51 has a first pressure surface 61, which is turned towards the space 28 and from its contact surface 53 and which has a first surface area projected on a radial plane. Furthermore, the first sealing element 31 has a second pressure surface 62, which is turned towards the space 28 and towards it contact surface 53 and which has a second surface area projected on the radial plane. The first surface area is larger than the second surface area, which in FIG. 5 means that the total force exerted by the rotating liquid body 29 will press the first sealing element 51 towards the second sealing element 52.

Figure 6:
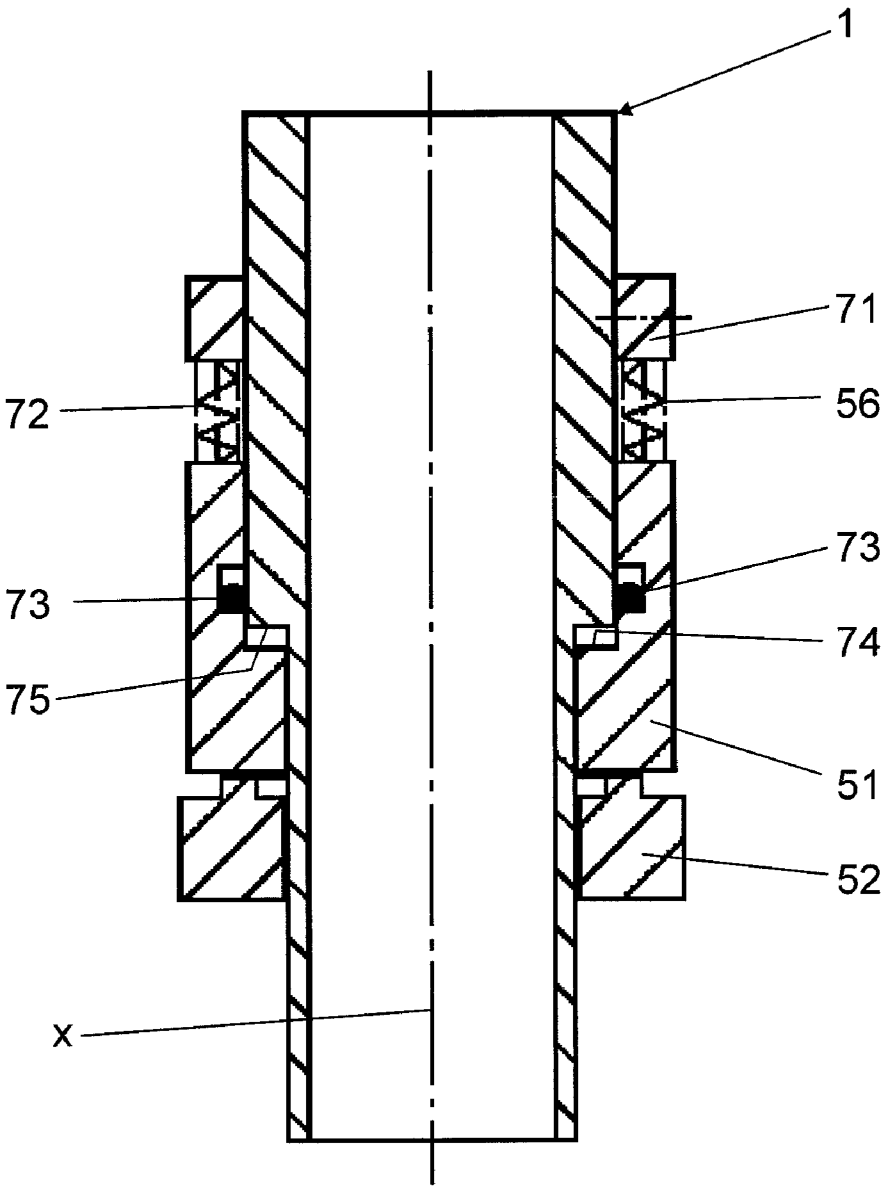
FIG. 6 discloses schematically a second variant of a mechanical sealing device of the centrifugal separator.

FIG. 6 discloses a second variant of the mechanical sealing device 30. The first sealing element 51, which is provided on the first separator part 1, compare FIGS. 3 and 4, may consist of the axially displaceable sealing element. The second sealing element 52 is provided on the second separator part 2, not disclosed in FIG. 6. The first sealing element 51 comprises in this variant a support element 71 which is fixedly connected to the first separator part 1. The pre-tensioning element 56 is provided between the fixed support element and the first sealing element 51. The pre-tensioning element 56 comprises a tension spring 72 which exerts a pulling force on the first sealing element 51, wherein this force acts to pull the first sealing element 51 from the second sealing element 52. The tension spring 72 may comprise an annular screw spring extending around the axis of rotation or a plurality of screw springs provided in parallel around the axis x of rotation. In FIG. 6 there is a separate ring sealing 73 which merely has a sealing function. The first sealing element 51 also comprises a shoulder 74 which forms a stop member coacting with a shoulder 75 of the first separator part 1 and limiting the displacement of the first sealing element 51 and thus the maximum size of the gap 57.

Figure 7:
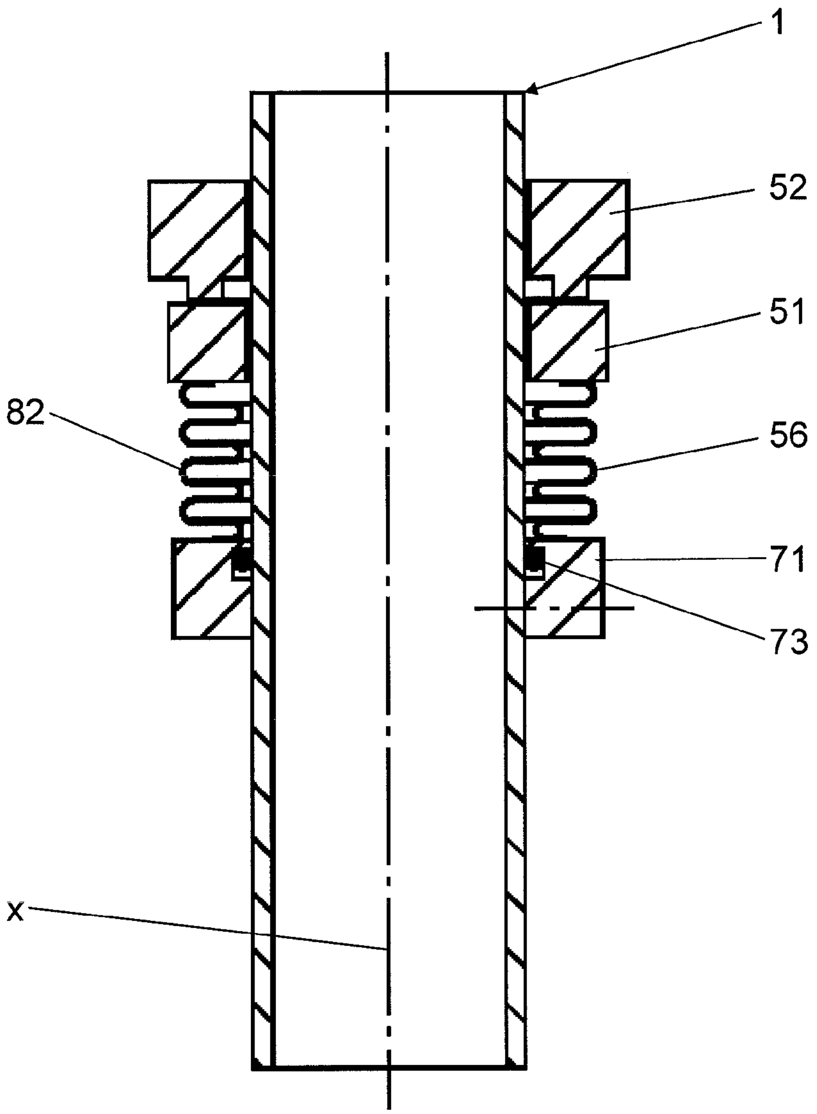
FIG. 7 discloses schematically a third variant of a mechanical sealing device of the centrifugal separator.

FIG. 7 discloses a third variant of the mechanical sealing device 30. The first sealing element 51 which is provided on the first separator part 1, compare FIGS. 1 and 2, may consist of the axially displaceable sealing element. The second sealing element 52 is provided on the second separator part 2, not disclosed in FIG. 7. The first sealing element 51 comprises in the third variant a support element 71, which is fixedly connected to the first separator part 1. The pre-tensioning element 56 is provided between the first support element 71 and the first sealing element 51. The pre-tensioning element 56 comprises a bellow spring 82 which exerts a pulling force on the first sealing element 51, wherein this force acts to pull the first sealing element 51 from the second sealing element 52. The bellow spring 82 extends around the axis x of rotation. In FIG. 7 there is a separate ring sealing 73 which merely has a sealing function. The bellow spring 82 may be manufactured in a metallic material or an elastomer material, such as rubber or an elastic polymer material. The bellow spring 82 has a determined minimal length which determines the maximum size of the gap 57.

FIG. 8 discloses a fourth variant of the mechanical sealing device 30. The fourth variant differs from the third variant merely through the design of the pre-tensioning element 56 which according to the fourth variant is designed as a sleeve 92 enclosing the support element 71 and the first axially displaceable sealing element. The sleeve 92 exerts a pulling force on the first sealing element 51, wherein this force acts to pull the first sealing element 51 from the second sealing element 52. The sleeve 92 extends around the axis x of rotation. The sleeve 92 may advantageously be manufactured in an elastomer material, such as a natural or synthetic rubber or an elastic polymer material. The sleeve 92 has a determined minimal length determining the maximum size of the gap 57.

The invention is not limited to the embodiments disclosed but may be varied and modified within the scope of the following claims. It is to be noted that the axially displaceable sealing element may be provided either on the first separator part 1 or the second separator part 2. In the embodiments disclosed, all inlets and outlets are directed in the same direction. However, it is to be noted that there might be inlets and outlets directed in different directions. In all embodiments hermetically closed centrifugal separators are disclosed. The invention is however also applicable when for instance merely one of the inlet or the outlet is hermetically closed, and for instance when a paring member is used at one or several outlets. It is to be noted that the centrifugal separators disclosed merely are disclosed schematically and that many details and components which are known per se do not appear from the figures. For instance, no radial outlets for discharge of sludge are disclosed, which are usual in many kinds of centrifugal separators. The mechanical sealing device may be applied to a variety of different kinds of centrifugal separators for a variety of different purposes.

What is claimed is:

1. A centrifugal separator comprising:

a first separator part;

a second separator part, which comprises a centrifuge rotor, wherein at least the second separator part is arranged to rotate during an operation state about an axis (x) of rotation at a determined speed in such a way that the first separator part and the second separator part rotate in relation to each other, and to be non-rotating during a rest state;

a space, which is provided in connection to the first separator part and the second separator part and which is arranged to house during the operation state a rotating liquid body containing a medium;

a mechanical sealing device, which is provided at the space for sealing the space;

the mechanical sealing device including a first sealing element, which is provided on the first separator part and has a first contact surface, and a second sealing element, which is provided on the second separator part and has a second contact surface which is parallel to the first contact surface;

the mechanical sealing device being designed in such away that the rotating liquid body during the operation state acts on one of the first sealing element and the second sealing element and displaces the same axially in such a way that the first contact surface and the second contact surface are pressed against each other with an abutment force; and wherein the mechanical sealing device comprises a pre-tensioning element which is arranged to exert a pre-tensioning force on the axially displaceable sealing element, which pre-tensioning force acts to displace the first contact surface and the second contact surface from each other that the pre-tensioning force is so large that a gap is formed between the first contact surface and the second contact surface in the rest state, and that the gap is dimensioned in such a way that it forms a throttling.

2. A centrifugal separator according to claim 1, wherein the pre-tensioning element extends around the axis (x) of rotation.

3. A centrifugal separator according to claim 1, wherein the pre-tensioning element extends in a recess, which is provided in the axially displaceable sealing element and extends around the axis (x) of rotation.

4. A centrifugal separator according to claim 1, wherein the pre-tensioning element extends in a recess, which is provided in the one of the first and second separator parts on which the displaceable sealing element is provided.

5. A centrifugal separator according to claim 1, wherein a ring sealing extends around the axis (x) of rotation and is provided between the axially displaceable sealing element and the one of the first and second separator parts on which the displaceable sealing element is provided.

6. A centrifugal separator according to claim 5, wherein the ring sealing forms the pre-tensioning element.

7. A centrifugal separator according to claim 1, wherein the pre-tensioning element is manufactured from an elastomeric material.

8. A centrifugal separator according to claim 1, wherein one of the axially displaceable sealing element has a first pressure surface, which is turned towards the space and from its contact surface and which has a first surface area projected on a radial plane.

9. A centrifugal separator according to claim 8, wherein the axially displaceable sealing element further comprises a second pressure surface turned towards the space and towards its contact surface and which has a second surface area projected on the radial plane.

10. A centrifugal separator according to claim 8, wherein the first surface area is larger than the second surface area.

11. A centrifugal separator according to claim 1, wherein the first separator part comprises at least one channel for feeding and/or discharging the medium into and/or out from the centrifuge rotor.

12. A centrifugal separator according to claim 1, wherein the first separator part is a stationary separator part.

13. A centrifugal separator according to claim 12, wherein the first separator part comprises a stationary casing which encloses the centrifuge rotor.

14. A centrifugal separator according to claim 12, wherein the first separator part comprises a stationary connection member which encloses a rotating inlet and/or outlet member of the second separator part, wherein the inlet and/or outlet member forms at least one channel for feeding and/or discharging the medium into and/or out from the centrifuge rotor.

* * * * *